UNITED STATES PATENT OFFICE.

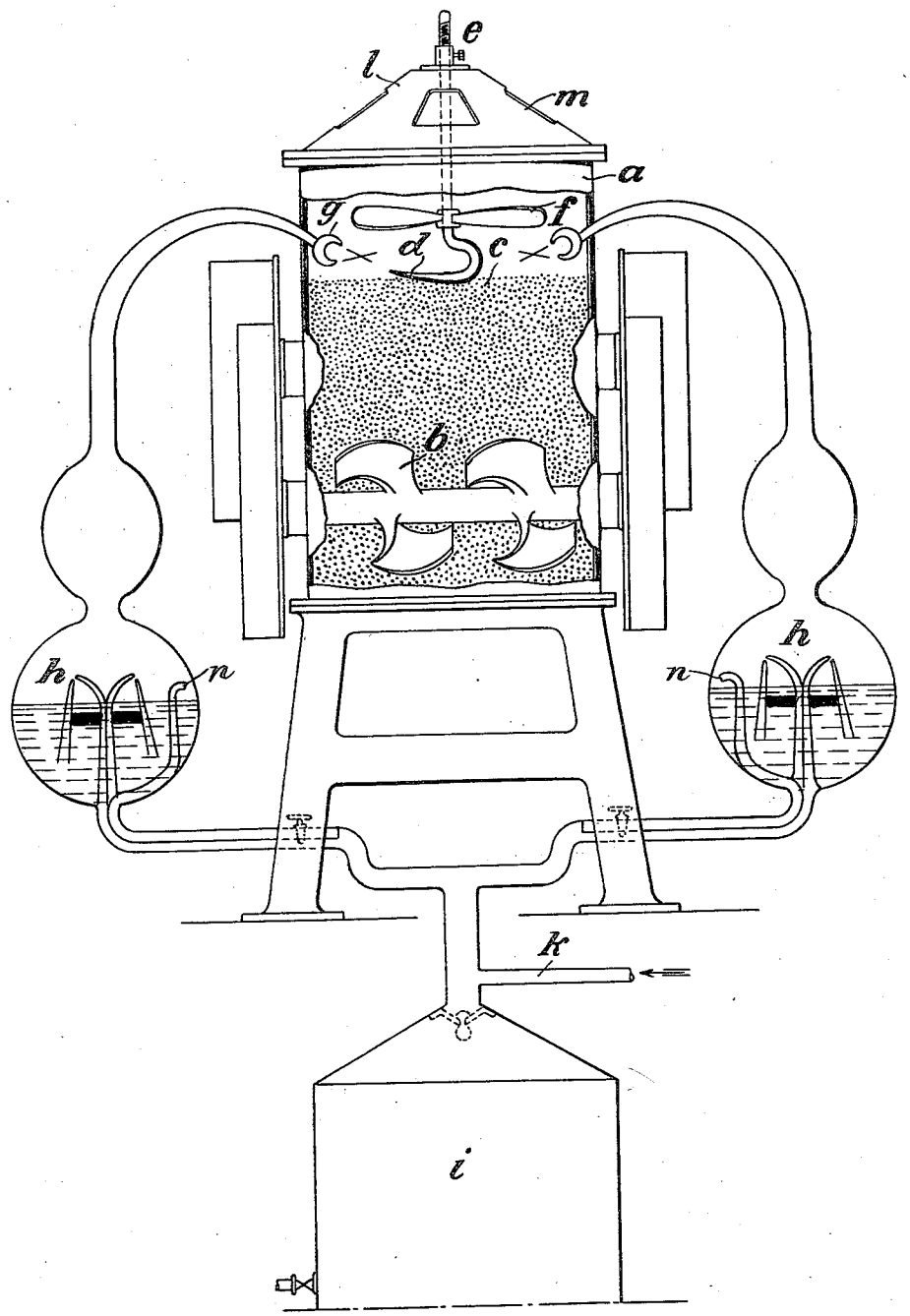

ALFRED KOHNER, OF BERLIN, GERMANY, ASSIGNOR, BY MESNE ASSIGNMENTS, TO THE CHEMICAL FOUNDATION, INC., A CORPORATION OF DELAWARE.

PROCESS FOR MAKING HORNY BODIES.

1,395,834.   Specification of Letters Patent.   Patented Nov. 1, 1921.

Application filed November 10, 1916. Serial No. 130,676.

*To all whom it may concern:*

Be it known that I, ALFRED KOHNER, a subject of the German Emperor, and resident of Berlin, in the Kingdom of Prussia and State of Germany, have invented certain new and useful Processes for making Horny Bodies, of which the following is a specification.

The object of the invention is a process and machine for making horny bodies particularly of clear translucent or transparent quality from mealy albuminous masses as casein.

According to the present invention, the raw mass in the form of finest meal is moistened very intimately with such a small quantity of water, that the mass remains mealy. The mass is then subjected to a high pressure at a high temperature to form the desired solid body (plate, rod or the like) without the addition of indurating agents and without bringing the mass into a preliminary plastic condition.

It is of great importance to bring the raw mass into the form of the finest meal, because it has been found that by using coarser meal, the desired object, that is the production of uniform clear horny bodies or objects can not be obtained. However, it is not necessary to subject the raw mass to a special grinding process, as the fineness of some commercial products is sufficient. Further a very intimate distribution of the moisture in the mass is of considerable importance. If this distribution is not carried out very carefully, the desired product will not be obtained. The above intimate distribution may be obtained, for instance, by blowing against the whirled mass steam or finely atomized moisture, whereby every grain of the powder or meal is struck forcibly by the steam or atomized moisture so that even at a lower temperature the "opening" or "finishing" of the powder is insured. At any rate the quantity of the moisture used is so small that the moistened mass remains in the form of meal. It has been found by experience that the desired result can be attained in this manner with a quantity of moisture considerably less than would otherwise be necessary. According to the improved process good results have been obtained with an addition of less than 20% of water. By increasing the force of blowing and whirling the percentage of moisture necessary for the process can be reduced to 15% and less. Consequently, as the quantity of moisture in the material is very low, the cost of production is considerably reduced as there is little superfluous moisture left to be driven off and the time necessary for drying the product is thus shortened. Furthermore, there is less danger that the objects produced from the mass will change their form and appearance by shrinkage.

It should be noted that according to the new process ordinary water may be used for moistening the mass and that no additional chemicals are needed. The process is thereby rendered much cheaper. On the other hand additions of ammonia or gas developing salts such as sodium bicarbonate and the like which cause a swelling of the single grains of the mealy mass may be employed. A quantity of filling or coloring matter may also be added.

The new process is quite inexpensive, as it avoids entirely the necessity of rendering the raw mass plastic prior to the pressing thereof to form solid bodies and it renders superfluous the use of heated high-pressure-kneading machines.

It should also be noted that the present process enables all chips and residual masses to be used over again; this is impossible with masses containing additional indurating agents.

For obtaining the desired result, it is often found of advantage to subject the mass to pressure only after a certain time has elapsed after the mass has been moistened. Since, however, the preserving of the mass in the mealy form is sometimes undesirable, this can be avoided by transforming the moistened raw mass into a solid intermediate product by means of a low pressure at a high temperature, or a high pressure at a low temperature. This intermediate product is durable and can be preserved for any length of time, and it may be brought into the desired condition by a high pressure at a high temperature as indicated above. The bodies produced according to the new process can be indurated later by any known process for instance by treating them with formic aldehyde.

A preferred embodiment of a machine for carrying out the new process is illustrated diagrammatically in the appended drawing.

Near the bottom of the receptacle or container *a* are rotatably mounted the helices *b* which may be rotated by any source of power (not shown). These helices, one of which is to be seen in the drawing, are designed to agitate thoroughly the mealy raw mass $c$ which may be casein. The surface of the mass $c$ is acted upon by a scraper $d$ rotated by a spindle $e$ from any source of power (not shown). This scraper may be adjusted vertically by any suitable means, such as a screw thread on the spindle $e$. With this spindle are also connected whirling wings $f$ adapted to finely distribute in the upper part of the container $a$ that portion of the mass which is thrown upwardly by the scraper $d$. In this upper part of the container are also inserted the spray-nozzles $g$ injecting with high speed a fine moisture, steam or mist, to be mixed with the mass $c$.

For producing the finest mist possible, an atomizer $h$ which is similar in construction to the known inhalers, and which, therefore, needs no special description, is inserted in the pipe connected with the nozzle $g$. The water or other fluid contained in the receptacle of this atomizer is brought into the condition of finely distributed mist by means of steam led to the atomizer from the receptacle $i$ through injector $k$. By the nozzle $n$, which is directed against the wall of the receptacle of the atomizer, the mist produced by the atomizer is thoroughly whirled and thrown against the wall of the atomizer so that drops of non-atomized fluid cannot reach the nozzle $g$. The fine mist thus formed is spread forcibly by the nozzles $g$ in the upper part of the container $a$. The mixing effect of the rapidly flowing jet of mist is increased by the mechanical effect of the rotatable wings $f$ acting as a kind of mechanical whip or beater. The speed and direction of rotation of the wings $f$ may be changed at will by any known means (not shown).

The steam used for producing the mist can be used simultaneously for controlling the working temperature of the mixing machine. Instead of the steam or preferably with the steam compressed air may be used for atomizing the fluid. This compressed air serves as a means for cooling and diluting the mist as well as for increasing the speed of injecting the mist in the container $a$. If only steam were used the content of moisture in the mist and the temperature of the mist would be too high and there would be great danger that the mass in the mixing machine might be brought into a plastic condition which is to be avoided according to applicant's process.

If desired, to the fluid to be atomized chemical agents can be added which may be distributed in the mass $c$.

The container $a$ is provided at the top with a cover $l$ made of canvas, gauze or other fabric or of wood or metal, which cover may be provided with windows $m$ of glass or the like making possible an inspection of the interior of the container $a$.

The pressure and temperature to be used in the new process may be varied within wide limits. However, by way of example, the following may be stated:

For producing plates of 40x40 cm. and of a thickness of 1 to 8 mm. in making the above mentioned intermediate product a temperature of 30° to 40° C. and a pressure of 60 kg./cm.$^2$, and in making the finished product a temperature of 70° to 80° C. and a pressure of 180 to 350 kg./cm.$^2$ have given good results. However, I wish it to be understood that these temperature and pressure conditions may be varied without departing from the scope of the invention.

What I claim and desire to secure by Letters Patent is:—

1. An improvement in the manufacture of horny bodies from powdered albuminous substances which comprises agitating the powdered albuminous mass introducing vaporous water, scraping the upper layer of the agitated mass, and whirling said upper layer above the main body of the substance until a determined content of moisture is evenly distributed in the mass.

2. An improvement in the manufacture of horny bodies from powdered albuminous substances which comprises introducing vaporous water, and continually whirling a portion of the powdered albuminous mass in the atmosphere of said vaporous water.

3. An improvement in the manufacture of horny bodies from powdered albuminous substances which comprises whirling a portion of the powdered albuminous mass above the main body of the substance, producing a vapor free from non-vaporous particles, and introducing said vapor into the container.

4. An improvement in the manufacture of horny bodies from powdered albuminous substances which comprises whirling the powdered albuminous substance in an atmosphere of a vapor including water and ammonia.

5. An improvement in the manufacture of horny bodies from powdered albuminous substances which comprises agitating the powdered albuminous mass, introducing a jet of vapor including water and ammonia, and whirling a portion of the powdered mass above the main body of the substance until a determined content of moisture is evenly distributed in the mass.

Signed at Berlin, in the Kingdom of Prussia and State of Germany this 10th day of August, A. D. 1916.

ALFRED KOHNER.

Witnesses:
 HENRY HASPER,
 ALLEN F. JENNINGS.